United States Patent [19]
Ng et al.

[11] Patent Number: 5,138,465
[45] Date of Patent: * Aug. 11, 1992

[54] METHOD AND APPARATUS FOR HIGHLIGHTING NESTED INFORMATION AREAS FOR SELECTIVE EDITING

[75] Inventors: Yee S. Ng, Fairport; Marilina R. Shaughnessy; Roger E. Button, both of Rochester, all of N.Y.

[73] Assignee: Eastman Kodak Company, Rochester, N.Y.

[*] Notice: The portion of the term of this patent subsequent to Dec. 24, 2008 has been disclaimed.

[21] Appl. No.: 407,510

[22] Filed: Sep. 14, 1989

[51] Int. Cl.$^5$ .............................................. H04M 1/40
[52] U.S. Cl. ................................... 358/153; 355/200; 355/218; 355/328; 358/448; 358/462; 358/467; 358/470; 382/61
[58] Field of Search ................... 355/328, 218, 40, 41, 355/42, 43, 201, 200; 358/453, 452, 401, 447, 448, 462, 464, 467, 470; 382/61, 9

[56] References Cited

U.S. PATENT DOCUMENTS

| | | | |
|---|---|---|---|
| Re. 29,104 | 1/1977 | Shepard | 382/61 |
| 3,914,043 | 10/1975 | McVeigh | 355/326 |
| 4,334,274 | 6/1982 | Agui et al. | 358/453 X |
| 4,538,182 | 8/1985 | Saito et al. | 358/80 |
| 4,558,374 | 12/1985 | Kurata et al. | 358/453 |
| 4,760,606 | 7/1988 | Lesnick et al. | 382/61 X |
| 4,777,510 | 10/1988 | Russel | 355/328 |
| 4,791,450 | 12/1988 | Mosehauer et al. | 355/328 |
| 4,908,716 | 3/1990 | Sakano | 358/453 |
| 4,987,497 | 1/1991 | Yoshimura | 358/448 X |
| 5,016,096 | 5/1991 | Matsunawa et al. | 358/448 X |
| 5,029,224 | 7/1991 | Fujisawa | 358/453 X |

FOREIGN PATENT DOCUMENTS 0261372 10/1988 Japan ................................... 355/218
0163764 6/1989 Japan ................................... 355/218

Primary Examiner—A. T. Grimley
Assistant Examiner—Robert Beatty
Attorney, Agent, or Firm—Warren W. Kurz

[57] ABSTRACT

Apparatus and method for producing selectively edited reproductions of an original documents with high productivity. Selected areas of information on the originals are bounded by a loop of a first or second type of highlighting material to indicate the area for reproduction in one or more treatment modes such as color-accenting. Alphanumeric character codes, written using the highlighting means, designate the treatment(s) to be applied. The two types of highlighting material respectively indicate that the selected area is located within or outside the boundary. By scanning the highlighted originals, the boundaries are distinguished and the character codes are detected. The resulting output signals are processed using boundary detection and character recognition algorithms and the resulting information is stored in a bit map. The information is used to adjust a charged image version of the original on an image-bearing member using an LED or other light source. The appropriate image frames, exposed in accordance with the highlighting, are then developed and transferred.

4 Claims, 9 Drawing Sheets

▨ = TREATMENT

▨ = TREATMENT

▨ = TREATMENT

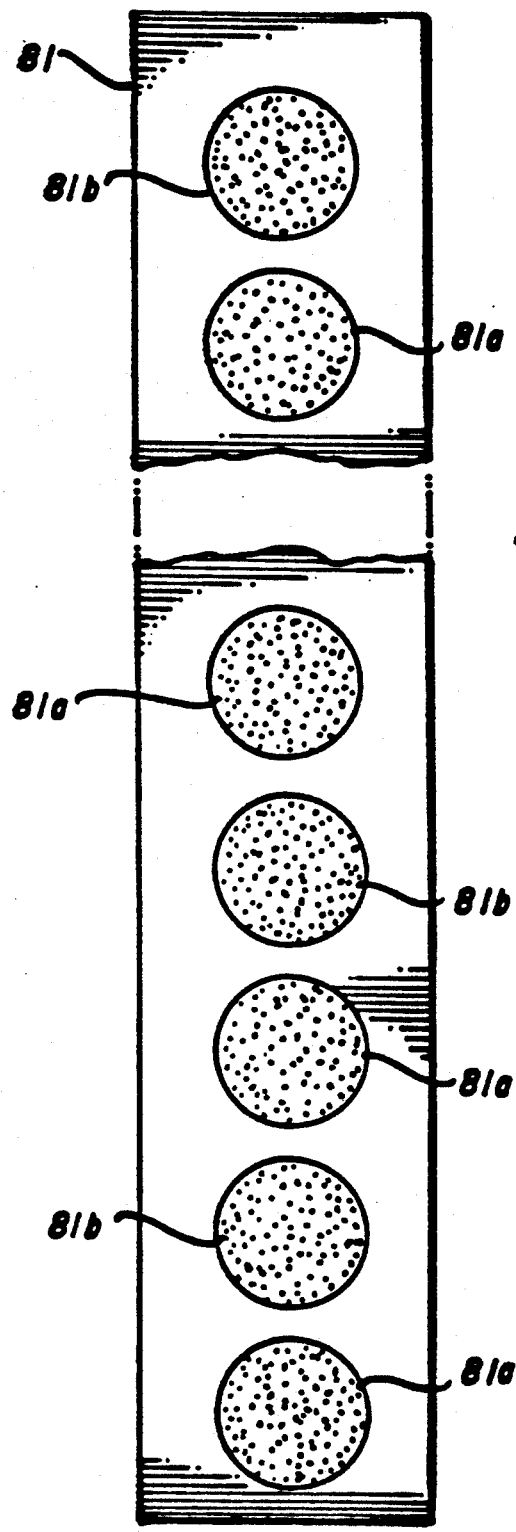

▓ = TREATMENT

▨ = TREATMENT

METHOD AND APPARATUS FOR HIGHLIGHTING NESTED INFORMATION AREAS FOR SELECTIVE EDITING

CROSS REFERENCE TO RELATED APPLICATION

This application is related to U.S. application Ser. No. 07/407,183 filed on even date herewith in the names of Shaughnessy et al. and entitled Reproduction Apparatus and Method with Alphanumeric Character Coded Highlighting for Selective Editing.

BACKGROUND OF THE INVENTION

1. Field of the Invention

The present invention relates to an apparatus for selective editing in electrostatographic reproduction apparatus, and more specifically to apparatus for highlighting one or more nested areas within a larger area to define which areas are selected for selective editing treatment.

2. Brief Description of the Prior Art

In the prior art as exemplified by U.S. Pat. No. 3,914,043, there is described an apparatus for electrophotographically reproducing originals with color accenting. In this apparatus, an original document is placed on a support. Indicator members adjacent the support are adjusted to designate the location of lines to be reproduced in a special treatment mode such as spot color. Similarly, in related U.S. Pat. No. 4,791,450 to Mosehauer et al., a digitizing tablet in a multicolor reproduction apparatus is used to input information on the location(s) to be selectively reproduced.

However, the indicator members or the digitizing tablet must be co-located with the support and the original, and adjustments must be made while at the copying machine. It is thus desirable to eliminate the necessity for editing the original while at the copier. Further, manipulation of moveable indicators and other such devices is a tedious and painstaking effort.

In U.S. Pat. No. 4,538,182, an image processing apparatus has CCDs for reading image data of an original, an edge detector for detecting edges of an area specified on the original with a loop or marks of a specific color, and an area detector for detecting the specified area. Also provided are memories for storing the image data read by the CCDs and a data selector and a data switching circuit for selecting the image data read by one of the CCDs which is to be supplied to an inkjet head for recording. For preventing contamination of the original, the loop or marks can be drawn on the original through an original cover including a transparent or semitransparent sheet member facing the image of the original. Images inside and outside the area or areas can be selectively reproduced in various combinations of the normal mode, red output modes involving different types of color conversion, and extinguishing mode. Image data from another source which is stored in another memory can be inserted at a desired part of the reproduced copy.

In U.S. Pat. No. 4,558,374 (Kurata et al), a picture data processing device is disclosed. A separate sheet, referred to as a mark-specifying original, is employed to draw lines comprising boundaries for the portion selected for extraction. The mark-specifying original is "read" by an image sensor and count value signals stored that are related to these boundary lines. The document sheet is then read by an image sensor. The data signal used to reproduce the original is inhibited by these signals except for the region which is to be extracted. However, productivity is substantially lowered by the time and effort spent on preparing and using the mark-specifying original with each original. When a multisheet document is to be reproduced with selective editing desired for several sheets in the document, the use of extra mark specifying sheets requires an inconvenient, time-consuming step: the sheets must be identified by interleaving or sequencing them with their respective originals.

The above methods and apparatus are in need of simplification. The use of keys, buttons, or other data entry devices (such as the digitizing tablet) is a time consuming hindrance when preparing an original for copying. Such methods are feasible only at the apparatus chosen for making the copies. Moreover, the task of editing—which typically entails the selection of one or more special treatments per original document page—is often one that is done best (or most conveniently) at a place away from the reproduction apparatus. In fact, that task is most often performed during the usual editing process at a desk, office, or other workplace and not at a copier. The editor is then forced to retain editing directions in memory, or annotate the original sheet in pencil, if not on scrap paper. The directions are then inputted later to the copier or other apparatus. It is further desirable that an original (that has been prepared for special treatment) be useable at any one of several reproduction apparatus that is equipped with the proper sensing and logic means.

The above difficulties are addressed in related U.S. Pat. No. 4,777,510. In the '510 patent, an original document sheet that is to be reproduced with special treatment such as spot color or color accenting may be highlighted by the use of a highlighting instrument. Each selected area is enclosed (highlighted) with a loop of ultraviolet (UV)-active highlighting ink. The original is then scanned to provide signals indicating the locations of the selected areas. The information from the document sheet is imaged upon an electrostatically charged photoconductor and developed so that the selected (highlighted) areas are reproduced according to treatment mode information from a control panel. Several areas on one page are treated similarly if each area is properly highlighted.

One problem that has not been easily resolved is the indication, interpretation, and treatment of multiple selected areas that are nested (i.e., one or more secondary areas are located within a larger primary area). The selected area may be ambiguously interpreted as a) lying within the outermost loop (and hence treated according to the mode specified for the outermost area), b) within one or more of the nested (inner) loops, or c) within one or more of the various inter-loop regions. In U.S. Pat. No. 4,777,510, the use of nested loops is not addressed. However, code marks, located in a selected margin area of the original, are described as distinguishing between different areas of highlighted information. The code marks are read and deciphered by a logic and control unit (LCU) and thus the operator need not input such information manually on a control panel. Even so, code marks are still difficult to use in that the mark is esoteric (it is not immediately recognizable as representing its respective treatment mode) and inconvenient (the mark may be accidentally omitted or drawn incorrectly.) Some reproduction jobs require that more than one treatment mode be applied to a particular original sheet. Therefore, marks placed at the margin are themselves subject to ambiguity, in that the exact positioning of a mark is critical. Furthermore, a system of code marks, if forgotten, is difficult for the casual user to reconstruct.

For some users, a hierarchy of code marks can be confusing to use and difficult to remember. The typical editor is more comfortable using a marking instrument that is dedicated specifically to indicating corrections. For example, in using a conventional pen or pencil, the editor may use red marks to denote "erasure" and blue marks to denote "insertion". Further, there are instances (typically in the graphics arts field) wherein many areas are selected on one page, and the code hierarchy described above becomes too complicated and consequently is burdensome to follow. Hence, a simpler scheme is needed, especially by the occasional or casual user of the loop-based highlighting scheme discussed above.

Accordingly, there is a need for a simplified apparatus for highlighting one or more nested areas within a larger highlighted area. The apparatus would unambiguously define which areas are selected for treatment and which are not. The preferred apparatus would include a marking instrument that is easy to use and would clearly indicate the relationship between any one of several highlighted loops. The marking instrument would be as easy to use with one nested loop as it would be with many nested loops. The apparatus would include a scanning means for detecting and processing the highlighted areas. The apparatus would preferably be adapted for use in the variety of reproduction apparatus described hereinabove.

SUMMARY OF THE INVENTION

The invention pertains to an apparatus and method for electrophotographically reproducing an original document sheet so that the reproduction is provided with areas of spot color or with other special treatment. An original document sheet is highlighted with a loop around each area for which treatment is desired. Each highlighting loop is composed of one of two inks of differing characteristics. One ink signifies that the selected area lies within the loop, and the other ink signifies that the selected area lies outside its respective loop. The original is then scanned by a sensor to provide signals regarding the locations of the loops and hence of the highlighted areas of image information to be specially treated. A treatment mode is selected for each selected area. The document sheet is then imaged upon, for example, an electrostatically-charged photoconductor and developed so that the selected areas are reproduced. The special treatment may involve one or a combination of the following: spot or accent color, selective halftone screening, shifting of one area relative to another, or erasure of a portion from the original.

BRIEF DESCRIPTION OF THE DRAWINGS

The subsequent description of the preferred embodiment of the present invention refers to the attached drawings wherein:

FIG. 7 is a plan view illustrating the sensor array of the image scanner station FIG. 4.

DETAILED DESCRIPTION OF THE PREFERRED EMBODIMENTS

Because electrophotographic reproduction apparatus are well known, the present description will be directed in particular to elements forming part of or cooperating more directly with the present invention. Apparatus not specifically shown or described herein are selectable from those known in the prior art. For convenience, "copier" and "electrophotographic apparatus" will be used interchangably, and such terms are intended to apply to other image reproduction apparatus unless such application is clearly inappropriate.

Figure 1:
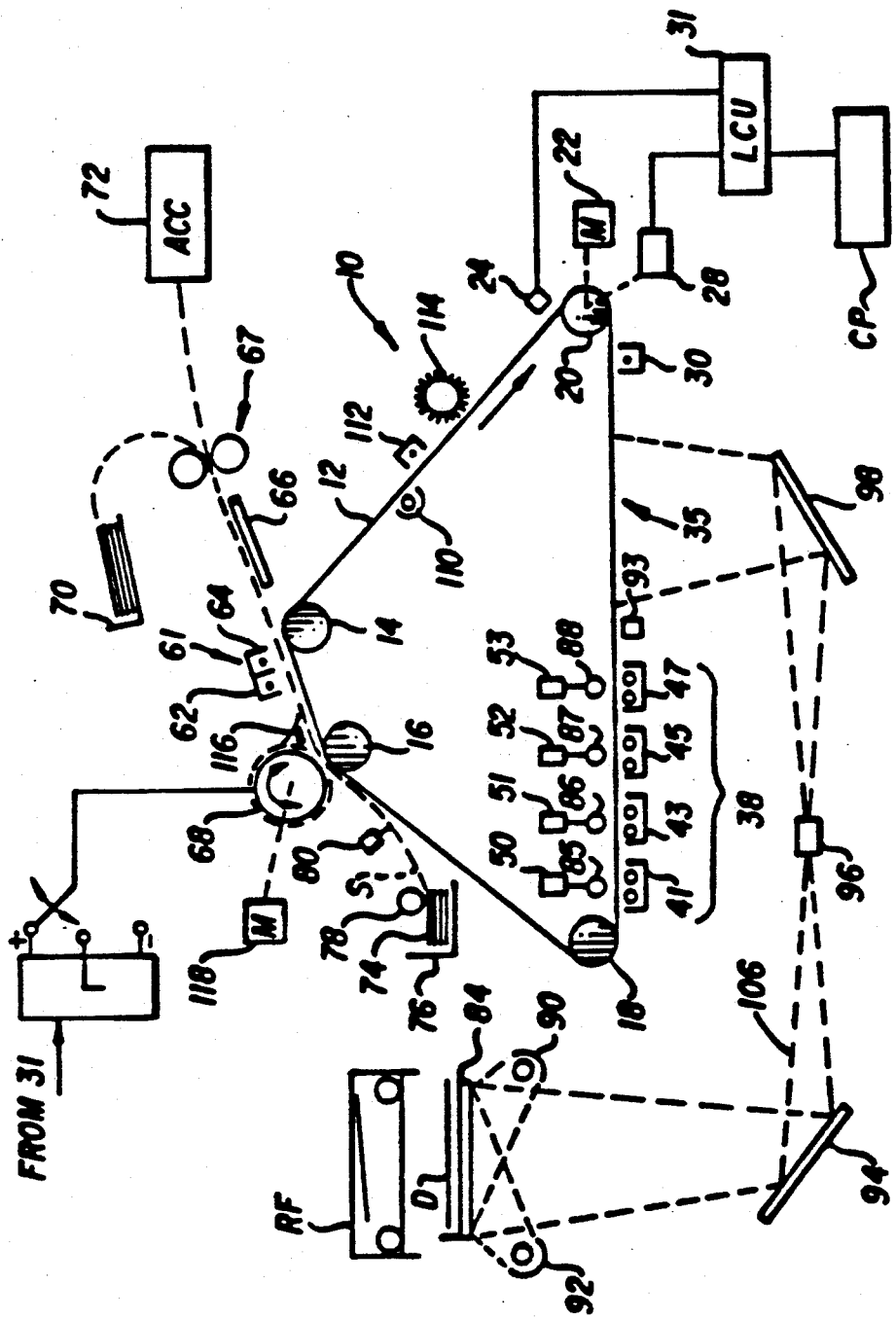
FIG. 1 is a schematic of a side view of the operating elements of a multicolor electrophotographic reproduction apparatus for practice of the present invention.

With reference to FIG. 1, a four-color electrophotographic reproduction apparatus is shown. The apparatus 10 includes a closed-loop image transfer member such as a flexible photoconductive web 12. The web 12 is supported on rollers 14, 16, 18 and 20. The rollers are mounted on the copier frame (not shown) with one of the rollers, for example, roller 20, rotatively driven by a motor 22 to rotate the web 12 in a clockwise direction about its closed path. The web has a plurality of sequentially-spaced image areas which pass successively through electrophotographic processing stations (charge, expose, develop, transfer, clean). The web also includes timing marks (or perforations) which are sensed by appropriate means, such as a timing signal generator 24 and LCU 31. An encoder 28 associated with the roller drive motor 22 also produces timing signals for the LCU.

The LCU 31 controls the electrophotographic process based on the instantaneous location of the web in the travel path. The LCU 31 has a digital computer, preferably a microprocessor, which is responsive to the input signals for sequentially operating the work stations and other machine functions. Programming of a number of commercially available microprocessors is a conventional skill well understood in the art. The particular details of any such program would, of course, depend on the architecture of the designated microprocessor.

Figure 2:
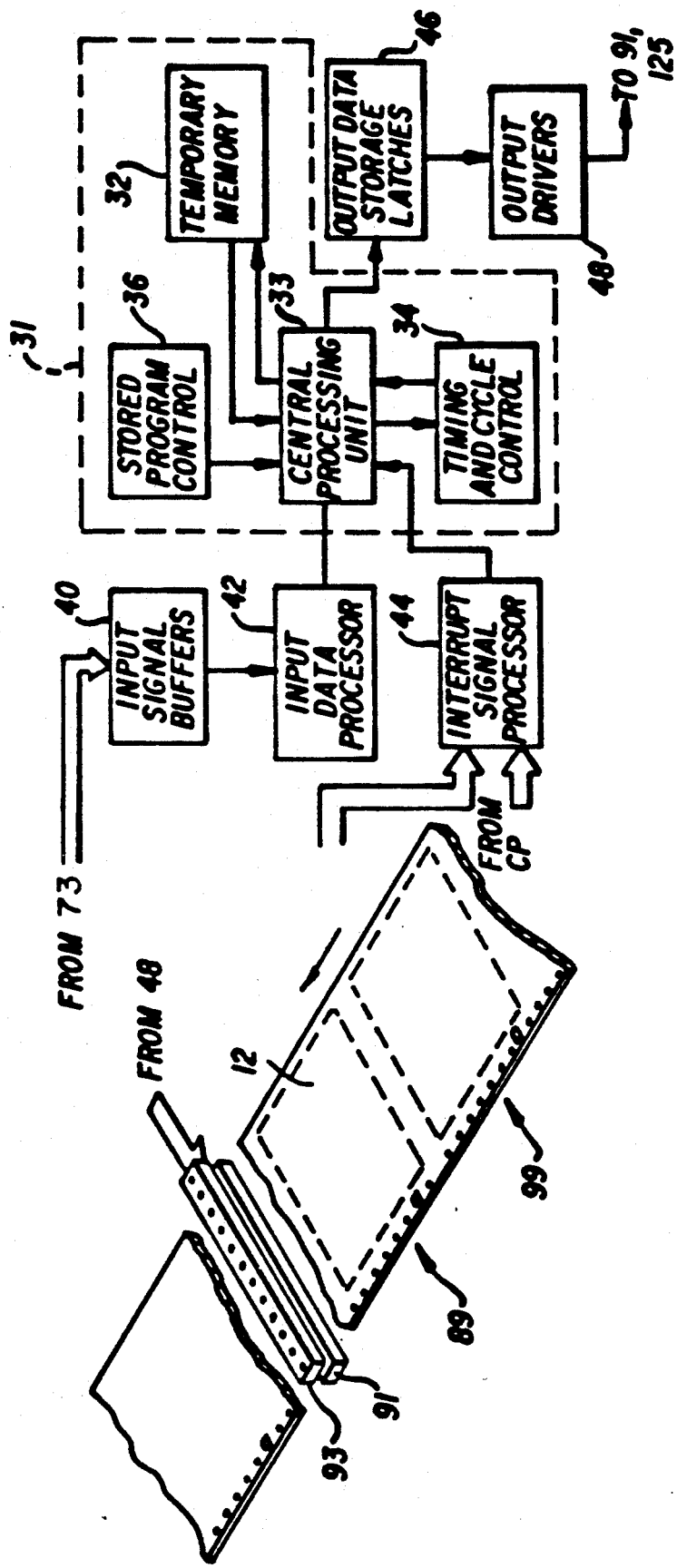
FIG. 2 is a schematic illustrating a recording array and a logic control unit for use in the apparatus of FIG. 1.

With further reference to FIG. 2, a block diagram of the logic and control unit (LCU) 31 is shown. The LCU consists of temporary data storage memory 32, central processing unit 33, timing and cycle control unit 34, and stored program control 36. Input data are applied either through input signal buffers 40 to an input data processor 42 or to interrupt signal processor 44. The input data are derived from various switches, sensors, and analog-to-digital converters. Input data and control signals from the LCU 31 are applied to storage latches 46 and then to output drivers 48 coupled to the various work stations, mechanisms, and controlled components associated with the apparatus. For example, data processed by the LCU 31 is used to indicate the number of copies to be made.

Figure 3:
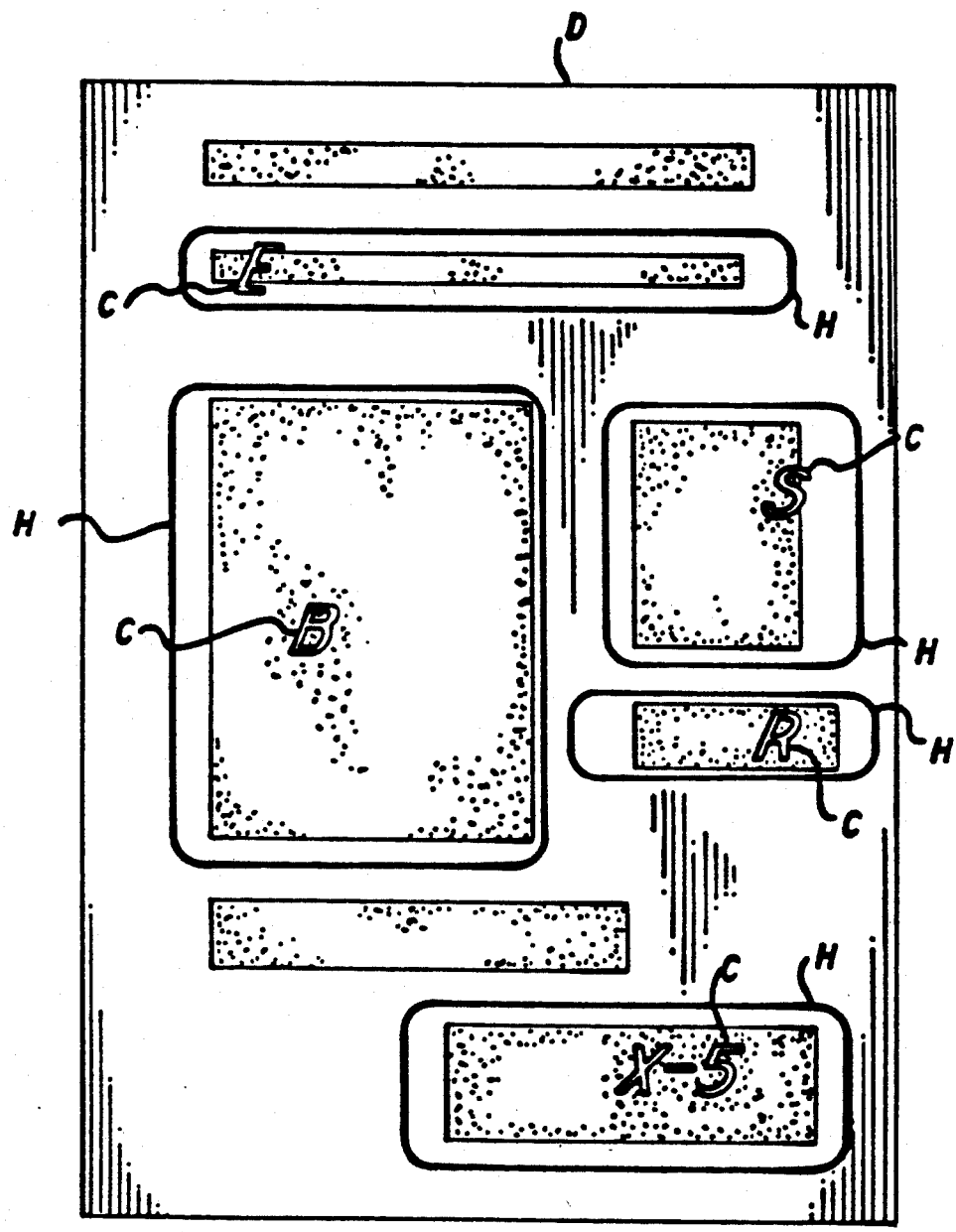
FIG. 3 is an illustration of an original document sheet showing various highlighted areas selected for special treatment by the apparatus of FIG. 1.

In FIG. 3 an original document sheet D is illustrated. The sheet D is to be reproduced with a special treatment, or combination of treatments, to one or more areas of the information on the sheet D. For example, spot color reproduction is one such special treatment. Accordingly, each selected area of the sheet D is enclosed with highlighting ink $H_i$ in a simple motion. In the preferred embodiment, the highlighting is deposited in a closed loop around the area of interest. For areas too small for a closed loop, the loop may be a stroke that covers the area of interest. By highlighting an area on the document sheet, the user is indicating that the area so defined will be treated according to one or more selectable treatment modes. Ink $H_i$ thus defines a boundary; the treatment will be applied to the area within the boundary.

To specify which of the available treatment mode(s) are to be applied to a highlighted area, the operator uses the highlighting ink $H_i$ to draw a character C representing the mode on the sheet D. The character(s) are drawn within the loop of ink $H_i$, or if the highlighted loop is such that the enclosed area is too small to contain the character, a default treatment mode is inputted to the control panel CP on the reproduction apparatus 10. The default mode will specify the treatment to be applied to all bound areas that lack a character therein.

An original document sheet that is, for example, to be reproduced with spot color or color accenting would include a selected character at each highlighted area in which spot color is desired. In the machine to be described, spot color is available in four colors. One color, for example black, is used as a default color for reproduction of the non-highlighted (background) information. The highlighted information then may be reproduced in red, green or blue. Thus, when spot color in red is desired, the spot color character "R" (as shown) would be applied; other selectable characters are selected from the preconfigured spot color palette, such as "G" for green and "B" (as shown) for blue.

The application of one or more highlighting characters is termed "character coding". This terminology is used for convenience to denote an entry of a representative mark or symbol and does not restrict the useable characters to a particularly abstract code or scheme. Indeed, in the preferred embodiment, the characters are alphanumeric and are easily recognized by the operator if applied with a visible highlighting ink $H_i$. However, other characters and symbols are useable, such as scientific symbols and proofreader's marks.

A variety of special treatments are contemplated for designation by this method of character coding. Selective halftone screening of an area of the reproduction may be specified by "S" (as shown). Image shifting of one area relative to the page format may be specified by "X" (for horizontal shifting) plus a numeral indicating the shift magnitude. For example, "X-5" (as shown) would indicate a respective shift in the x axis in standard increments, e.g. tenths of inches or centimeters. Erasure, that is, non-reproduction or blanking of a highlighted portion of the page, may be specified by "E" (as shown). To specify job stream programming when reproducing a multisheet original document, one or more characters such as "C" for chapterization, "T" for title page, and "I" for page insertion (not shown) may be used on the respective originals or inserts. Each highlighted area may include more than one character, such that a combination of treatments may be specified for the respective area. An example would be "S R" to specify an area for reproduction in a screen mode and in red spot color. Additionally, one character could be selectable as always representing a particular combination of modes, such as "A" (attention mode) for a combination of red spot color and image shift. Optionally, the highlighting ink $H_i$ may be a formulation that is invisible to the unaided eye, so that the highlighting and a "security" character could be placed on portions of an original that are considered confidential (i.e., non-reproducible) or for distribution to certain users. The character would then be an alphanumeric combination that would prevent reproduction of that portion. In this regard, reference is made to U.S. Pat. No. 4,739,377, filed in the name of James D. Allen.

In the preferred embodiment, the continuous loop of highlighting ink $H_i$ is preferably an ultraviolet (UV) active ink of yellow/green color and transparent so as not to obliterate or mask the area so covered, i.e., the ink is transparent to the reproduction apparatus, but may be visible to the eye. This highlighter ink, when illuminated with light radiation of short (UV) wavelengths, will absorb such radiation and will emit light with a particular spectral characteristic. In another embodiment, useable for marking areas for security purposes as will be described below, the highlighting ink $H_i$ can be invisible so as to give no indication that it has been applied. The ink may be applied simply with a felt-tip pen or other writing instrument. Both the closed loop and the character may be drawn with the same highlighting ink $H_i$.

Figure 4:
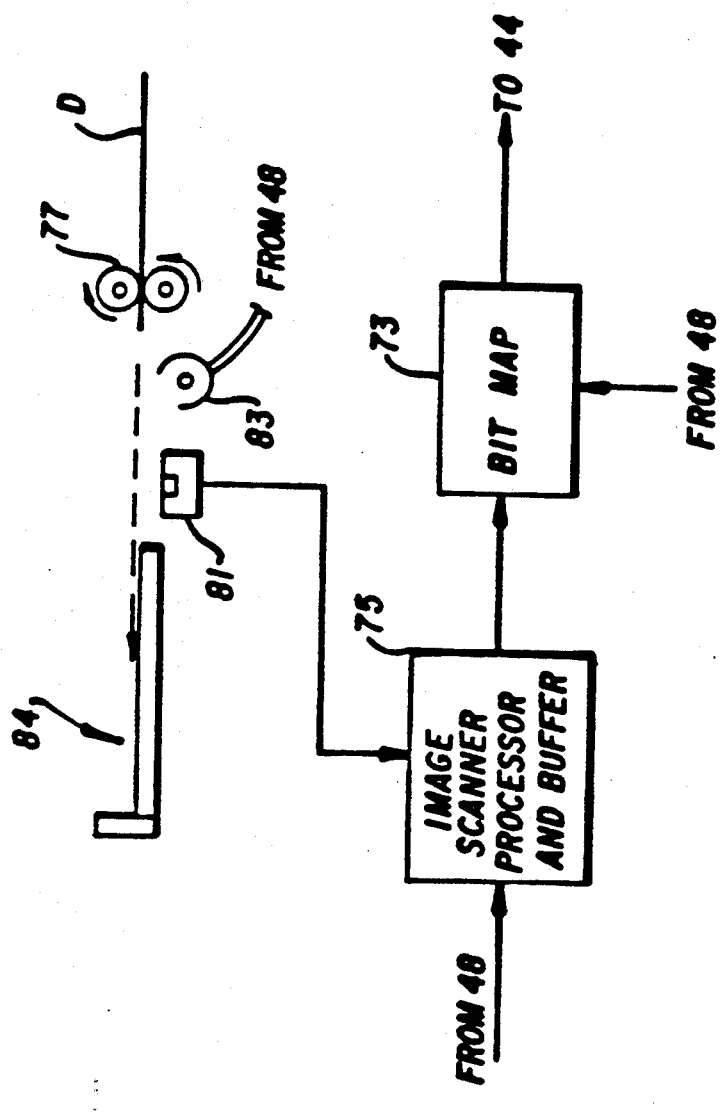
FIG. 4 is a schematic illustrating an image scanner station and related apparatus for receiving original document sheets.

Turning now to FIG. 4, the highlighted document sheet D is illustrated as being fed into driven rollers 77, which in turn drive the document sheet over a scanner 81 and a UV source of light 83. The document sheet D is exposed to light from a center tube fluorescent lamp in the source 83 which will stimulate the highlighting $H_i$ to emit light. The scanner 81 comprises a plurality of photoelectric sensors, such as charge-coupled devices (CCD's) or photodiodes, that are responsive to light in the spectral range emitted by the U.V. active ink. The scanning device is similar to conventional image scanners except that it is provided with alternating filters or sensors responsive to a threshold level of light of differing spectral bandwidth. The sensors are arranged linearly across the transverse direction of the document sheet to scan the entire sheet as it is transported onto a transparent glass platen 84. Suitable means may be provided for detecting the leading and trailing edges of the sheet to provide signals to commence and terminate scanning respectively.

Certain sensors will respond to the stimulated light emission from the ink $H_i$ as distinguished from emissions from the underlying sheet D and emissions from another highlighting ink, $H_o$, as will be described below. The desired emission, stimulated from any one of a class of sharp cut-off dyes, provides a measurable signal difference between the highlighting $H_i$ and the sheet D, even though some sheets may contain fluorescent whiteners. Such a dye is preferably Europium (III) thenolyl trifluoroacetonate. The lamp 83 is preferably optimized for stimulating the Europium dye; however, other dyes (such as those found in conventional yellow "highlighter" pens) are stimulated also. As each line of the sheet is scanned, certain sensors detect any UV-illuminated areas directly above them and their respective output signals represent areas of highlighting. The light detected by the CCD array 81 generates a series of analog voltages. Each voltage corresponds to the presence or lack of the emitted light preferably at a resolution of 400 dots per inch (dpi). Any sensors that do not detect highlighting have a quiescent output signal.

Figure 5:
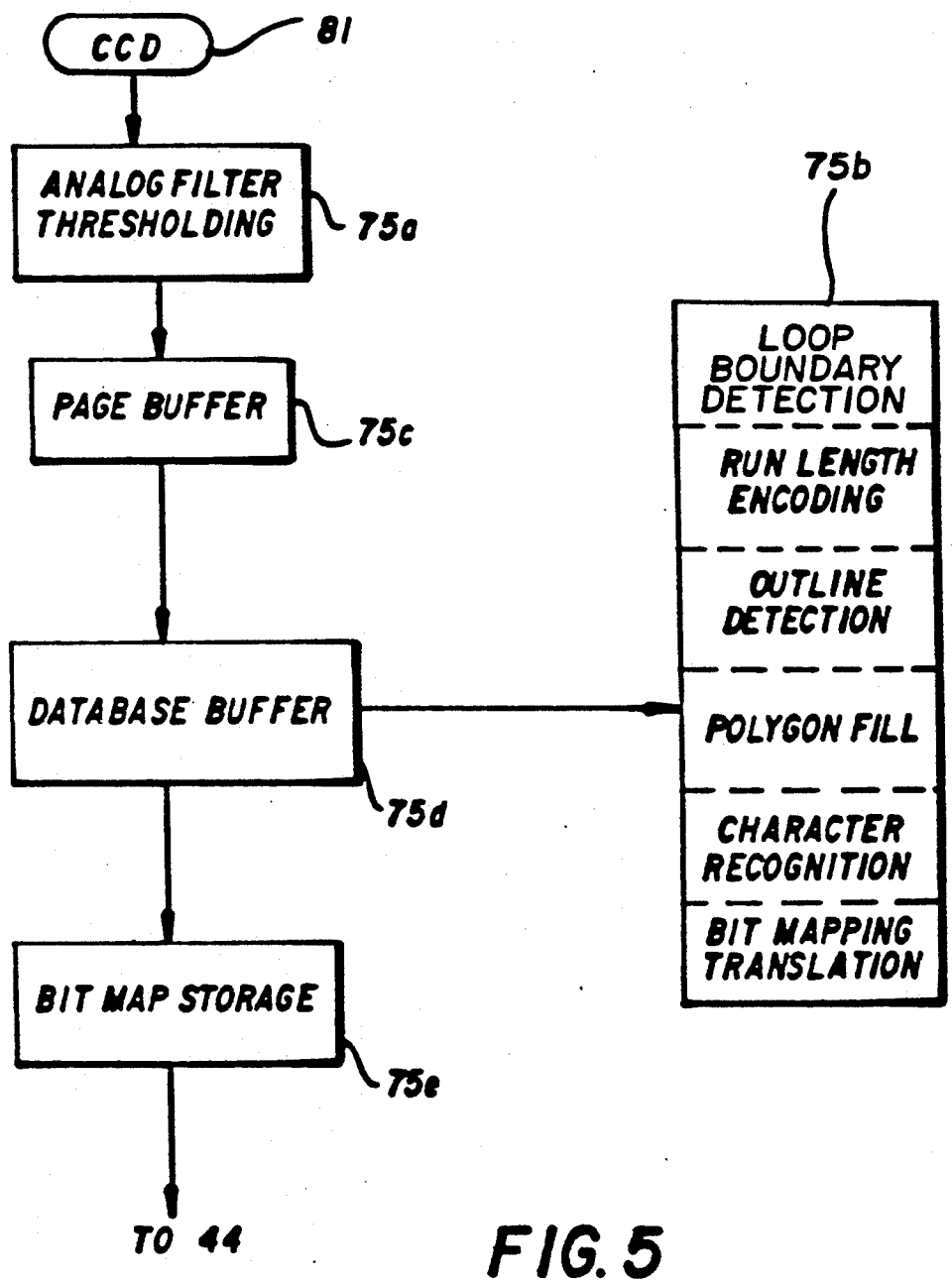
FIG. 5 is a schematic illustrating the image processing algorithms used in the image scanner processor shown in FIG. 4.

As shown in FIG. 5, the signal from each CCD scanner sensor is fed to an image scanner processor and buffer 75 which logically decides which signals represent highlighted areas and which signals represent unhighlighted areas. An analog filter and threshold section 75a converts the signal resolution from 400 dpi to 25 dpi. Circuitry using thresholding and/or comparator devices 75a may also be provided so as to distinguish highlighted areas from unhighlighted areas on a support that is somewhat reflective to UV light. Each line of scan data generated by the CCD array 81 is then encoded by a processor 75b into run length codes as it is received from the scanner. After the entire document page has been scanned and stored in a page buffer 75c, the page is processed to create a bit map. The processing includes an outline detecting algorithm applied to the encoded scan data by the processor 75b, the resulting database generated in the database buffer 75d is further processed to identify areas that have been completely enclosed, so as to distinguish a closed continuous loop of highlighter. Whether the area is a closed area or a simply a highlighted stroke (line), or whether the closed area encloses any other areas, are determined by an outline detection algorithm. A polygon fill algorithm will then translate the areas into the bit map. Once the database has been completely processed and translated into the bit map, the bit map is ready for output from the bit map storage 75e to the interrupt signal processor 44.

Application software residing in the image scanner processor 75b is responsible for encoding the scan data into runlength codes, performing the outline detection algorithm on the runlength codes, generating a bit map, and outputting the bit map. The application software further recognizes each highlighter character, using known character recognition schemes, and associates each character with the respective highlighted area (i.e., the area that underlies the character.) The character (or default mode, if necessary) is translated to an instruction set suitable for use by the processor 75 in creating the respective bit map(s) for that image frame. Another instruction set may be provided to the interrupt signal processor 44 and the LCU 31 to carry out the respective treatment mode instruction. These inputs are converted into signals and stored in temporary memory 32 via interrupt signal processor 44. (Combinations of characters are similarly recognized and translated.) A programmable library of characters and character combinations is used with the character recognition software. The library is programmable according to the needs of the operator.

Scan data encoding, outline detection, and bit map generation are controlled by corresponding algorithms. The runlength codes represent the horizontal intercepts of scan data along a scan line. The scan data generated by the CCD contact scanner 81 is stored in a two dimensional array that is 320 bits (10 long words) wide per line and 212 lines deep. After all runlengths for the scanline have been encoded and stored in the array, a zero is entered into the array to signify the end of the scanline for a connectivity analysis. The outline detection algorithm processes the runlength codes to form a linked list of data structures. The list represents isolated regions of highlighter ink on the document. These data structures constitute a data base of region data and enclosure relationships from which circled regions can be identified and filled.

Figure 6A:
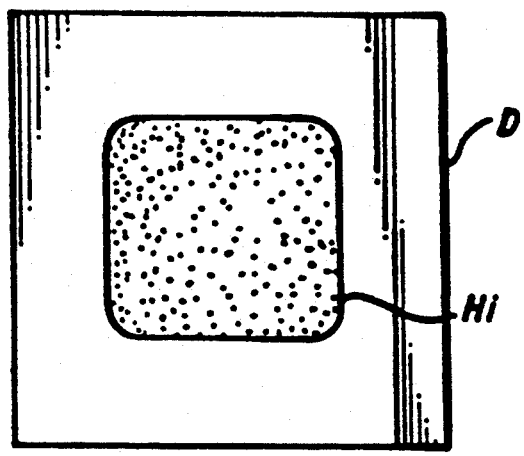
FIGS. 6a–6c are illustrations of an original document sheet showing various highlighted areas to be specially treated.
Figure 6B:
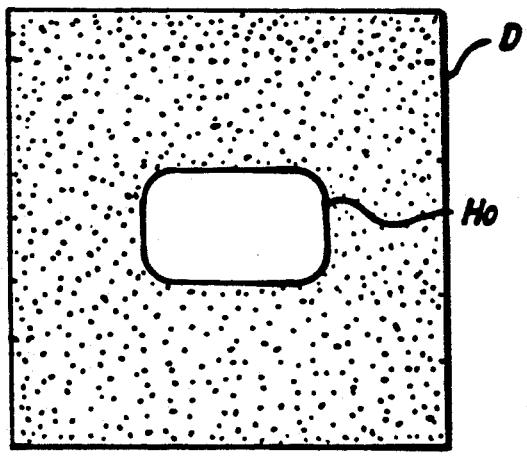

As shown in FIGS. 6a and 6b, the user may also select an area outside a loop for treatment. To distinguish such an area, a second type of UV-active ink, $H_o$, is applied to the sheet D. Just as ink $H_i$ is useable to specify an area *inside* its boundary, ink $H_o$ is applied such that an area *outside* its boundaries is defined for treatment.

Figure 6C:
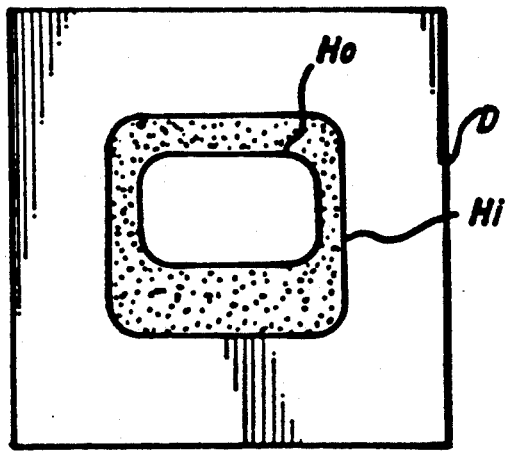

As illustrated in FIG. 6c, if the operator wishes to exclude one or more nested areas within an encircled (primary) area, the operator may enclose those nested areas within loops of appropriate ink $H_i$ or $H_o$. Hence, the area on the document sheet D which lies within a boundary set by ink $H_i$ and without a boundary of ink $H_o$ will receive treatment. The inks $H_i$ and $H_o$ may be used in multiple combinations to selectively indicate a variety of areas, including non-rectilinear ones. (In FIGS. 6a-6c, the chosen treatment mode is the erasure mode, although the character which normally specifies erasure, "E", is not shown for purposes of clarity.)

Ink $H_o$ has a stimulated emission spectra that is within a band of wavelengths that differs from that of ink $H_i$. However, ink $H_o$ comprises all of the other characteristics described above with respect to $H_i$, e.g., ink $H_o$ is also applied by a marking instrument and in fact, for convenience, both inks ($H_i$ and $H_o$) may be supplied from one instrument which has separate ink reservoirs and respective felt tips for inking. Two single-ink instruments may be used instead. The inks $H_i$ and $H_o$ may be provided with visibly different hues so that the inks are readily distinguished by the user. As is known in the art, each ink formulation may afford this visible coloration without obscuring or otherwise impeding the readability of the underlying document. For further convenience, the character code described above is written in either of the $H_i$ or $H_o$ inks.

As illustrated in FIG. 7, the scanner 81 comprises an integral filter array so that one filter element 81a is imposed between the sheet D and a respectively small group of adjacent photoelectric sensors. The filter element 81a selectively transmits the ink emission wavelength from the first UV-activated highlighting ink, $H_i$. A different filter element 81b, similarly imposed over another sensor group, selectively transmits the emission wavelength of the second UV-activated highlighting ink $H_o$. The filter array is shown as a linear arrangement; various other configurations of the filter array are feasible, such as a staggered array; depending on the size and density of the sensor array, other embodiments of the scanner 81 are contemplated as having one sensor for each element of the filter element pair 81a and 81b.

A boundary transition detection algorithm resident in the image scanner processor and buffer 75 detects the transition of an area at boundaries provided by highlighting inks $H_i$ and $H_o$. As exemplified in FIGS. 8a-8b, as a scan line L crosses the document sheet D, a sequence of bits corresponding to the wavelength emitted from the document sheet D is sensed. Each scan line is processed to create a list of detected records, or frames. As the scan line crosses the frame drawn in ink $H_i$, $H_i$ is detected at points a and b, indicating that treatment is desired between point a and point b. Frame 1 is thus created. However, the sensed data from the scan line also causes a second frame (frame 2) to be created when ink $H_o$ is detected at points c and d. Frame 2 thus indicates that treatment is desired outside of that frame at points c to d. Additionally, bits s and e signify the starting and ending points, respectively, of the scan line L, and those points thus indicate the extent of the area outside frame 2.

Figure 8A:
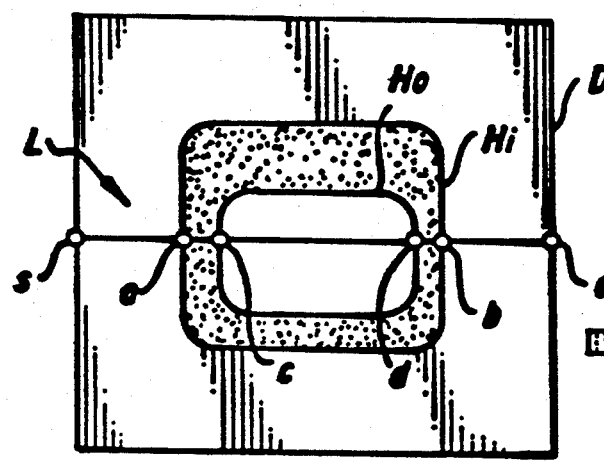
FIGS. 8a–8b are similar views to that of FIG. 6c but illustrating a scan line used in practice of the present invention.
Figure 8B:
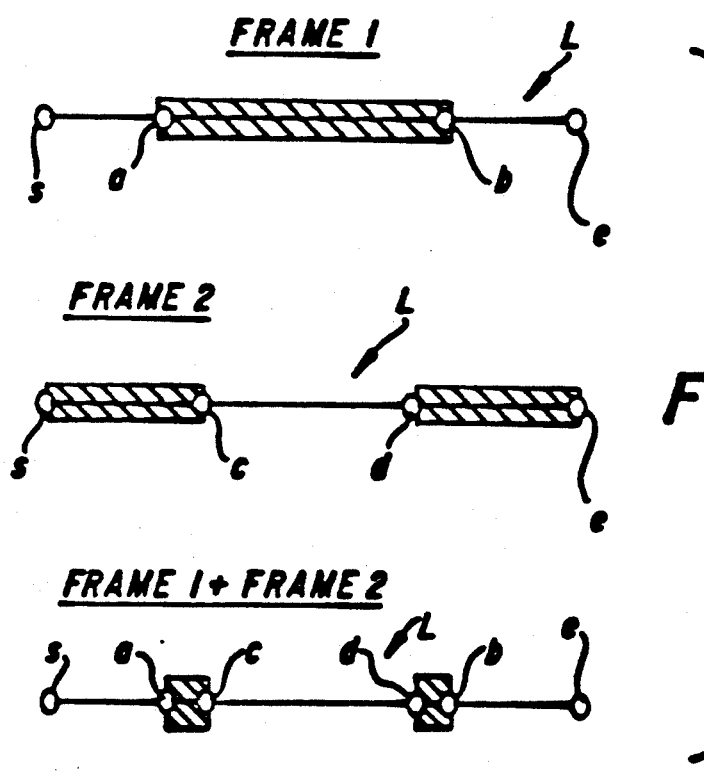
Figure 9A:
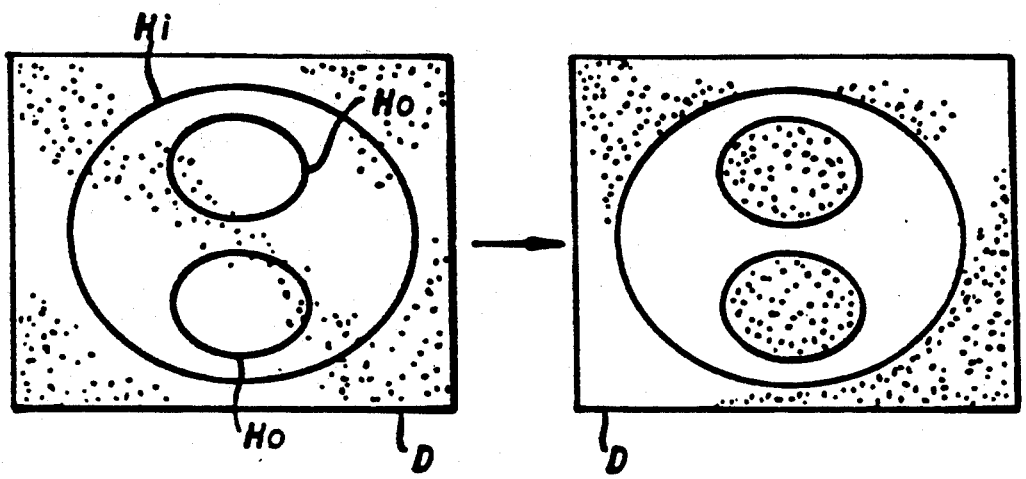
FIGS. 9a–9c are illustrations of portions of another original document sheet showing various nested areas to be specially treated and the corresponding portions of the resulting reproduction.
Figure 9B:
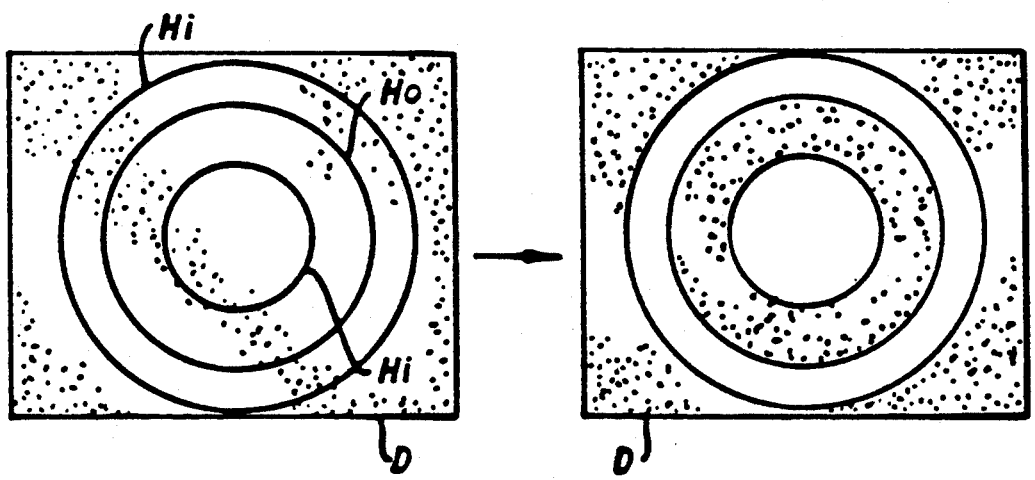

As shown in FIG. 8b, frames 1 and 2 with detected points a, b, c, d, s, and e are logically AND'ed together so that the logical analysis performed by the processor 75 will show the completed area(s) to be treated. The AND'ed output is provided to the bit map and then to the interrupt signal processor 44 to control the desired selective editing function of the reproduction apparatus 10. Typical examples of $H_i$ and $H_o$ configurations and their resulting reproductions are shown in FIGS. 9a and 9b.

Figure 9C:
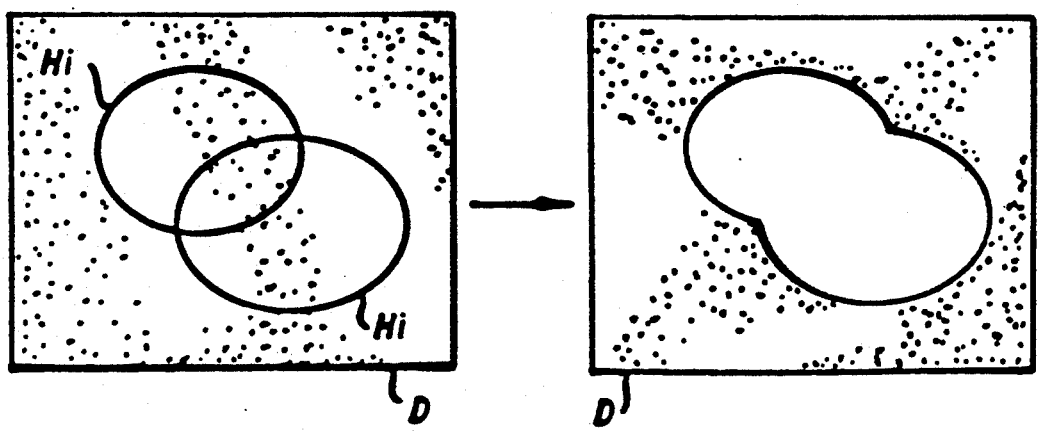

By highlighting an area on the document, the operator is requesting a treatment mode for all of the area enclosed (including the area marked by the highlighter). Only those areas which are completely enclosed are identified as selected areas. Because the operator is free to select more than one area for treatment, overlapping loops will be joined and both circled areas will be treated together, as illustrated in FIG. 9c.

The highlighting inks $H_i$ and $H_o$ are not restricted to florescent materials and may be composed of any one of a variety of compositions which, when applied to a sheet D, are detectable by a corresponding detection means. Such compositions would be characterized as (but not limited to) those exhibiting reflective, conductive, magnetic, radioactive, dielectric, or charged (ionic) attributes. The respective detector may simply sense the presence of a "characteristic" quality in the highlighting material or the detector may stimulate the highlighter to respond with a predetermined, singular "signature" (as does each of the preferred inks $H_i$ and $H_o$ floresce.) $H_i$ and $H_o$ would therefore each exhibit detectably different amounts or values of that "quality" or "signature", e.g., the inks would differ in their reflectivity, conductivity, magnetic orientation, radiochemistry, etc. The array 81 would correspondingly be constructed from known sensors which are capable of detecting the differing characteristic. The preferred embodiment, which uses the combination of the florescent highlighter ink and a corresponding UV filter array 81, is attractive for its simplicity and low cost.

Thus, while the invention has been described with regard to a highlighting ink that may be detected through light sensing means, other types of non-optical highlighting material may be used, such as a transparent magnetic ink useable with magnetic readers detecting same. The ink may be placed on the "backside" of a sheet and thus need not be transparent when so placed. When the highlighting ink is placed on the backside, the positions of the sensor 81 and source 83 would be adjusted so as to be in position to read the backside of the sheet. The highlight ink may be placed on the frontside of the document as is more convenient, and allowed to "bleed" through the paper sheet to the backside thereof. The highlight ink UV light source and sensor may then be positioned to read the backside of the sheet to determine the location of the area to be specially treated. This may permit for a better signal to noise ratio especially where the UV would otherwise have to be sensed from the front where it covers black text.

After the document has been fully scanned, it reaches a stop provided at an edge of the platen, which positions the document sheet so as to be in register with image frames on the photoconductive web 12 during an exposure. The original document sheet D is now oriented, image side down, on transparent glass platen 84 that is supported by the copier frame.

In the event the processing of the highlighting or the scanned character(s) is unsuccessful, the LCU 31 may so inform the operator by causing an alarm tone to be emitted from a piezoelectric transducer (not shown) or a message to be displayed on the control panel CP (see FIG. 1). The operator then has the option of removing the sheet D to check for an error or malfunction, such as inadequate or incorrect highlighting, or to enter a default treatment mode.

In the following description of the reproduction process, it will be assumed for convenience that the original sheet D in FIG. 8a has been marked for spot color, in red, of a highlighted area between the loops $H_i$ and $H_o$. The process is similar to, and thus illustrative of, the other selectable machine treatment modes, as will be described shortly. The LCU 31 supplies the image data and corresponding process control signals as previously mentioned.

In the preferred embodiment, exposure lamps 90, 92, such as xenon flash tubes, are located beneath recirculating document feeder RF and the platen 84 within the frame of the reproduction apparatus. The lamps flood the document sheet with light and a reflected image of the document sheet is transmitted via mirror 94, lens 96, and mirror 98 in focus on rays 106 to an area 35 lying in the plane of the web 12. Thus, for example, as it is desired to reproduce the document sheet in two colors, the document sheet D is illuminated two times in succession to form two separate electrostatic latent images thereof, as illustrated in FIG. 1. The timing of the flash of lamps 90, 92 is controlled by the LCU and related to the travel of the web 12 to expose adjacent, nonoverlapping areas of the web to the images of the document sheet. One or more corona charging units, exemplified by corona charger 30, is located upstream of the exposure area 35, and applies a uniform primary electrostatic charge, of say negative polarity, to the web 12 as it passes the charger and before it enters the exposure area. The photoconductive properties of the web cause the primary charge in the exposed areas of the web to be discharged in that portion struck by the exposure light. This forms latent imagewise charge patterns on the web in the exposed areas corresponding to the image on the document sheet. The properties of the materials or methods used for highlighting are such that the photoconductor cannot distinguish the highlighting.

In accordance with the bit map, a selective erase means erases the area or areas of one image frame that represent the area corresponding to that between loops $H_i$ and $H_o$, which is to be colored in accent color (e.g., red). Also erased are one or more areas of the other image frame that represent areas corresponding to that outside $H_i$ and inside $H_o$ that are to be reproduced in a standard or default color, e.g., black. As illustrated in FIG. 2, based on synchronized timing signals and the registration of the original on the platen, the first image frame 89 passes above the selective erase means 93. Signals from bit map 73 representing areas to be selectively erased on frame 89, i.e., areas corresponding to that between loop $H_i$ and $H_o$, are inputted through interrupt signal processor 44 into the LCU 31. The LCU in response to timing signals from the timing signal generator 24 and/or encoder 28 enables output drivers 48 to activate a linear LED array in the erase means 93 situated transverse to the web surface. Light from the LED array may optionally be collected and focused by optical fibers integrally formed as a gradient index lens array, such as a SELFOC (trademark of Nippon Sheet Glass Co., Ltd.) array, to illuminate the photoconductor 12. When the next image frame 99 passes over the selective erase means, the LCU 31 provides an inverse logic operation to selectively erase all information on image frame 99 except for that to be color accented.

The web 12 is then advanced to bring the selectively erased latent image frames into a development area 38. The development area has a plurality of magnetic brush development stations, each containing a different color of toner. For example, the toner colors may be black, red, green and blue. Thus, the red toner particles may be in station 43, green toner particles in station 45, blue particles in station 47, and black toner particles in station 41. The toner particles are agitated in the respective developer stations to exhibit a triboelectric charge of opposite polarity to the latent imagewise charge pattern. Backup rollers 85, 86, 87, and 88, are situated to oppose respective developer stations 41, 43, 45 and 47. Actuators 50, 51, 52 and 53, when energized, selectively move the respective backup rollers into contact with the web 12 to engage the web with the respective magnetic brushes. The charged toner particles in the engaged magnetic brush are attracted to and develop the oppositely-charged latent image.

If, as in the present example, the first image frame is to be developed in black and the second image frame is to be developed in red, as the image frame 89 reaches the black development station 41, actuator 50 moves the backup roller 85 to deflect the web toward the station 41. When the first image frame leaves the development area of station 41, the actuator 50 returns the backup roller 85 to its non-deflecting position. The second image frame (containing only the information for red development) is similarly developed with only red toner from station 43.

The developed black and red image frames are then transferred and superimposed on a receiver sheet in accurate register to form a reproduction of the original with the highlighted information in red. This is accomplished by feeding a receiver sheet S from a supply stack 74 in hopper 76, using roller 78 in synchronism with movement of the first image frame. The receiver sheet engages the web and is registered by mechanism 80 with the first image frame. A transfer roller 68 having a compliant insulating surface is electrically biased for attracting the developed image to sheet S. Roller 68 is driven by a stepper motor 118 which receives actuating signals from the LCU 31. The receiver sheet S clings to roller 68 due to the bias potential; alternatively, a vacuum-assist or a sheet-clamping mechanism may be used.

Synchronized rotation of roller 68 and web 12 brings the leading edge of the copy sheet S back into transferable relationship with the web as the leading edge of the next (black) toner image arrives at roller 68. The bias on roller 68 is reversed to repel sheet S from roller 68 at separator device 116 onto web 12 in registration with the second image frame. The image is transferred to the receiver sheet by chargers 62 and 64 at detacker 61. The copy sheet S is separated from the web and conveyed by air transport 66 to a roller fuser 67 and then to an exit hopper 70 or an accessory finishing unit 72. A corona charging station 112 and a rear erase lamp 110 may be located upstream of a cleaning unit 114 to neutralize any charge remaining on the web. This method and apparatus for image transfer is described in U.S. Pat. Nos. 4,477,176, issued Oct. 16, 1984 and 4,251,154, issued Feb. 17, 1981 in the name of Matthew J. Russel, which are incorporated herein by reference.

Additional methods and apparatus for exposure of an original sheet D are contemplated. For example, the image may be scanned and imaged upon the photoconductor using a scanning reflection exposure of the original, or by using light which has been electronically generated from, say, a data stream. In the former, segments of the original are scanned by a light source and the light modulated by the document is imaged upon the photoconductor. In the latter, the document is digitized by an image reader. The resultant digital signals are used to modulate light directed upon the photoconductor. In the latter example, the selective erase function provided by a laser or an LED array could be incorporated into the electronic imaging device and accomplished electronically. All scanner output is processed by the image scanner processor and buffer 75 and stored in the bit map 73 so that the bit map contains (for each pixel) image information and highlight information stored in binary signal format. The information is conveyed to the LCU 31 and selected LED's on an LED exposure array 125 are illuminated to record only the information desired to be reproduced for each color according to the treatment mode indicated by the character coding.

The foregoing description of the reproduction process assumed that the original sheet has been marked for spot color, in red, of a highlighted area. Further details of the reproduction apparatus 10 and related methods for selective editing may be found in the cross-referenced copending application Ser. No. 07/407,183, filed on even date herewith and in commonly assigned U.S. Pat. No. 4,777,510 the contents of both being incorporated by this reference. Where a single color copier is provided the use of the different colored highlighters may be used to designate the area to be reproduced in the one color.

The highlighting method and apparatus as contemplated herein is amenable to automation and may be incorporated in any document-processing machinery. Thus the highlighter is not limited to a hand-held device but would include, for example, an automated ink applicator moved by a servo-controlled positioner as is known in the art. Such an automated highlighter could be included in a section of a simple paper cutting or punching device, or in a more complex device, such as an automated paper slitter, a printing or lithographic press, or in a color copier, facsimile machine, or other imaging device.

The invention has been described with regard to the application of highlighting inks $H_i$ and $H_o$ onto the document sheet being reproduced. In a modification of the method and apparatus of the invention, the highlighting inks may be applied to a transparent sheet that has been overlaid upon the document sheet. In this modification, the overlay and document sheet comprise the document sheet to be reproduced when exposed together. The document sheet and the transparent sheet may also be read successively by an electronic image reading device and the special treatment provided during the reproduction process in accordance with signals generated in response to the markings on the transparent sheet without reproduction of the markings on the transparent sheet.

The invention has been described in detail with particular reference to the preferred embodiments thereof, but it will be understood that variations and modifications can be effected within the spirit and scope of the invention.

What is claimed is:

1. Apparatus for reproducting image information on a document sheet with special treatment given to a selected image area on such document sheet, said selected image area being identified by (i) a marking on the document sheet which differs in color from the image information and (ii) a character code which identifies the type of special treatment to be given said selected image area, said marking and character code being recorded on the document sheet by the apparatus operator, said apparatus comprising:
 a) means for scanning the document sheet to detect said mark and said character code, said scanning means being effective to produce output signals indicating the location of the selected image area and the type of special treatment to be given thereto; and
 b) means responsive to said output signals for reproducing said image information on a copy sheet with a desired special treatment given to the indentified selected image area.

2. The apparatus as defined by claim 1 wherein said marking encircles a portion of said image information and has a spectral characteristic indicating whether the encircled image information is to receive the special treatment or the image information outside the encircled portion is to receive such treatment.

3. The apparatus as defined by claim 2 wherein said marking comprises a UV-active ink.

4. A method for reproducing document image information on a document sheet with special treatment being given to a selected image area on such document sheet, said method comprising the steps of:
 a) identifying said selected image area by encircling such area with a mark having a color which differs from the color of the image information;
 b) indicating the type of special treatment by recording a character code in close proximity to said mark;
 c) scanning said document sheet to identify said mark and character code and to produce signals indicating the location of the selected image area and the type of special treatment to be given thereto; and
 reproducing said image information on a copy sheet in accordance with said signals.

* * * * *